W. X. NORTON.
LOCK BRACKET FOR SPOTLIGHTS.
APPLICATION FILED OCT. 2, 1919. RENEWED MAR. 13, 1922.
1,431,139.
Patented Oct. 3, 1922.
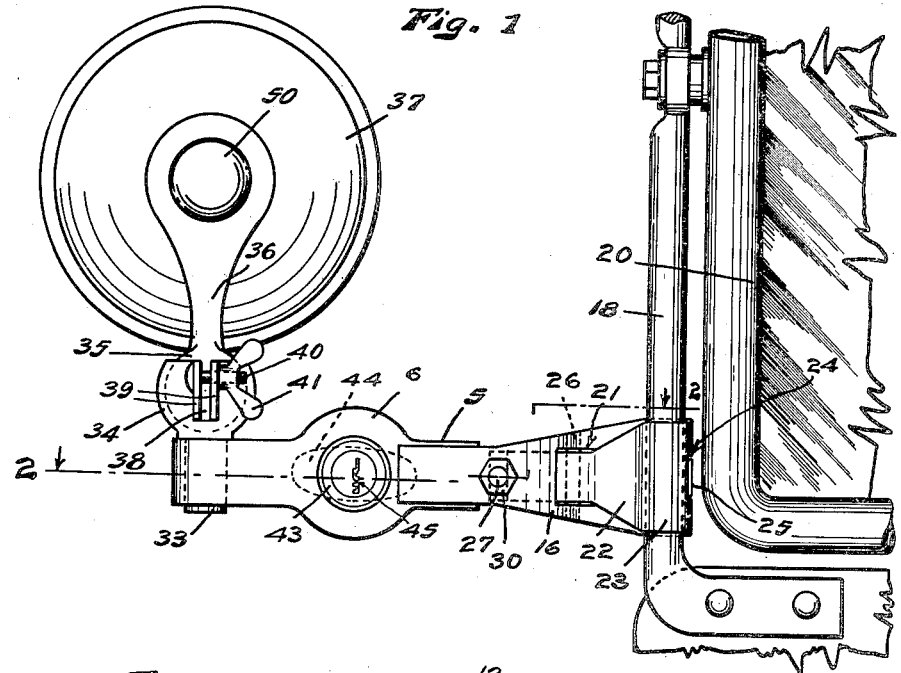
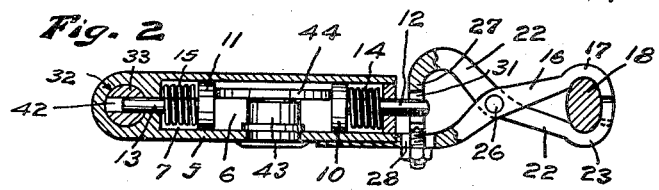
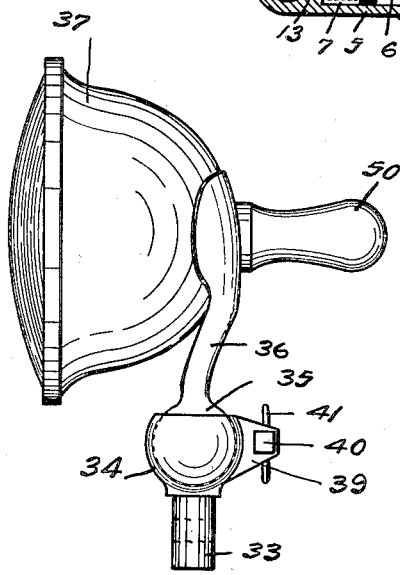
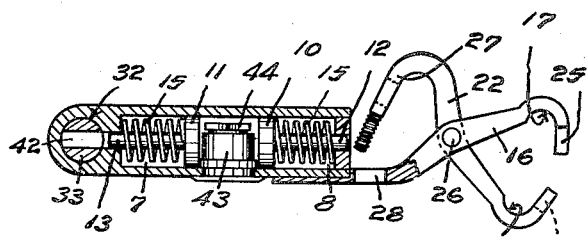
Inventor,
Wm Xavier Norton,
By his Attorney,
Horace Barnes Patented Oct. 3, 1922.

1,431,139

UNITED STATES PATENT OFFICE.

WILLIAM XAVIER NORTON, OF SAN FRANCISCO, CALIFORNIA.

LOCK BRACKET FOR SPOTLIGHTS.

Application filed October 2, 1919, Serial No. 328,032. Renewed March 13, 1922. Serial No. 543,456.

*To all whom it may concern:*

Be it known that I, WILLIAM XAVIER NORTON, a citizen of the United States, residing at San Francisco, in the county of San Francisco and State of California, have invented certain new and useful Improvements in Lock Brackets for Spotlights, of which the following is a specification.

This invention relates to improvements in brackets or mountings for spotlight lamps of the form that are commonly secured to the windshield supports of motor vehicles by universal joint mechanism so that they may be adjusted to throw a beam of light in any desired direction.

The object of this improvement is to provide a spotlight bracket of strong and substantial construction that is adjustable to windshield supports of different size and shape; that will admit of universal movement of the lamp that is secured thereto; and that is provided with strong and substantial lock mechanism by which the lamp may be locked to the bracket and the bracket may be locked to the windshield to prevent the spotlight from being stolen, the lamp being easy to remove from the bracket when it is unlocked therefrom so that it may be used as a trouble lamp about the vehicle.

The invention consists in the novel construction, adaptation and combination of parts of spotlight supporting mechanism, as will be more clearly hereinafter described and claimed.

In the accompanying drawings, Figure 1 is a view in elevation of apparatus constructed in accordance with this invention, as it may appear when secured to the upright support of the windshield of a motor vehicle, a fragment only of the windshield and windshield support being shown; Fig. 2 is a view partly in plan and partly in cross-section of the same substantially on a broken line 2—2 of Fig. 1; Fig. 3 is a view similar to Fig. 2 except that the parts are shown in the unlocked position and the bracket is disconnected from the windshield support; and Fig. 4 is a detached view in side elevation of the spotlight lamp and shank that supports the same.

Like reference numerals designate like parts throughout the several views.

In the accompanying drawings, the numeral 5 designates a tubular bracket member that is provided with a medially arranged, enlarged lock-receiving socket 6 and that is further provided at each side of the socket 6 with longitudinally arranged passageways 7 and 8 wherein are disposed piston members 10 and 11 that are connected with pins 12 and 13, respectively, and are arranged to work against springs 14 and 15 by which the pistons and the pins connected therewith are normally urged toward the lock-receiving socket.

The tubular bracket member 5 is rigidly secured at one end to a bracket arm 16 that projects endwise therefrom and is provided with a curved jaw member 17 that is adapted to engage the support 18 of a windshield 20.

The fixed bracket arm 16 is recessed in its medial portion as at 21, to permit the passage therethrough of a movable bracket arm 22 that is provided on its inner end with a curved jaw member 23 that is disposed in opposition to the jaw member 17 and adapted to cooperate therewith in pinchers-like fashion to grip the windshield support 18. The end of the jaw member 23 is preferably provided with a notch 24 into which a projection 25 on the end of the jaw member 17 is adapted to fit in dovetail fashion when the jaw members are closed on the support 18.

The two bracket arms 16 and 22 are connected with each other by a common pivot 26 which fits so tightly in one of the bracket arms that it is practically impossible to remove the same, or which may be countersunk and riveted at both ends so that it cannot be removed.

The outer end 27 of the bracket arm 22 is bent at substantially right angles to the remaining portion thereof, and is provided with a threaded tip portion that is adapted to project through a hole 28 in the bracket arm 16 and have a nut 30 screwed thereon. The bent portion 27 of the arm 22 is normally in a position adjacent to the end of the tubular member 5 when the device is clamped on the windshield bracket 18 and such bent portion 27 is provided with a hole 31 through which the pin 12 may be projected to lock the jaw members in a clamped position on the support 18 irrespective of the loosening of the nut 30.

The outer end of the tubular member 5 is provided with a vertically arranged socket 32 for the reception of a cylindrical stud 33 on the bottom end of a spherical socket 34. Disposed within the socket 34 is a ball 35 that is rigid on the bottom end of a shank 36, the upper end of which is connected with and supports a spotlight lamp 37.

The socket 34 is permanently pressed about the ball 35 when these parts are manufactured so that the ball can not be removed without seriously damaging the socket, and such socket is provided on one side with a slot 38 at the two sides of which are outwardly projecting lugs 39 through which extend a bolt 40 that is provided with a wing nut 41 by which the socket 34 may be clamped about the ball 35 to hold the spotlight lamp in any adjusted position.

If desired, the lamp 37 may be provided with a rearwardly projecting handle 50 to facilitate the adjustment of the same. The stud 33 is provided with a transverse hole 42 into which the pin 13 may be projected to lock the lamp to the tubular member 5.

Disposed within the lock-receiving recess 6 is a lock 43 to which is secured a cam 44 that is arranged to be turned from the position shown in Fig. 3 to the position shown in Figs. 1 and 2 when a key, not shown, is inserted in a keyhole 45 that is accessible from the exterior of the member 5, and turned. The lock 43 may be of any well-known form of construction so long as it will not permit the turning of the cam 44 until a key that fits the lock is inserted in the keyhole 45 and turned.

In operation, the jaws of the pinchers-like bracket arms 16 and 22 are placed upon the upright support 18 and are tightened thereon by screwing up the nut 30, thereby securely clamping the lamp bracket to the windshield support. The stud 33 is placed within the socket 32 and is turned so that the hole 42 is in prolongation of the axis of the pin 13. A key is then inserted in the lock 43 and the cam 44 is turned into the position shown in Figs. 1 and 2, thereby moving the piston members 10 and 11 outwardly and causing the pins 12 and 13 to be projected into the holes 31 and 42, respectively, thereby locking the bracket to the windshield support and locking the spotlight lamp to the bracket.

The devices may remain locked as above described, under all ordinary conditions, thereby preventing the lamp from being stolen; but if it is desired to use the spotlight lamp about the car as in case of trouble the same may be easily unlocked and removed from the bracket and may be easily replaced and locked within the bracket again after its use as a trouble lamp is finished.

The universal joint formed by the socket 34 and ball 35 may be adjusted to any desired position and the friction within such joint may be varied by adjustment of the wing nut 41.

It is obvious that changes in the form, dimensions and arrangement of parts of this lamp bracket may be resorted to within the scope of the following claims.

What I claim and desire to protect by Letters Patent, is:—

1. A spotlight supporting bracket comprising a tubular bracket member, jaw means secured to one end of said bracket member for clamping said bracket member to a fixed support, a spotlight supported for universal movement on the other end of said bracket member, pins disposed within said bracket member and arranged to lock said jaw means to said support and said spotlight to said bracket member, and a lock controlling the movement of said pins.

2. A spotlight supporting bracket comprising a relatively fixed clamping arm, a relatively movable clamping arm pivoted to said fixed arm and arranged to co-operate therewith to clamp a support, means for adjusting said movable arm relative to said fixed arm, a tubular bracket member rigid with said fixed arm, a spotlight pivotally connected with the outer end of said tubular bracket member, and locking devices in said tubular bracket member for locking said spotlight to said tubular bracket member and said clamping arms in a clamped position on said support.

3. A spotlight supporting bracket comprising a tubular bracket member, a jaw member fixedly secured to one end of said tubular bracket member, another jaw member pivoted in pinchers-like manner to said fixed jaw member, the end of said last-named jaw member being bent at substantially right angles to the body thereof and arranged to project through a slot in said rigid jaw member and said bent end having a perforation therein and being threaded for the reception of a nut whereby said jaw members may be clamped on a fixed support, a spotlight supported for universal movement on the other end of said tubular bracket member, a pin disposed in said bracket member and arranged to be projected through the perforation in the bent end of said movable jaw, another pin disposed in said bracket member and arranged to lock said spotlight to said bracket member, and a lock controlling the movement of said pins.

4. A spotlight supporting bracket comprising a tubular bracket member having a transverse socket at one end, jaw members secured to the other end of said bracket member for clamping the same to a fixed support, one of said jaw members having a pin-receiving recess arranged adjacent the end of said tubular bracket member, a pin disposed within said tubular bracket member and arranged to be projected into the recess in said jaw member to lock said jaw members to a fixed support, a spring for withdrawing said pin from said recess, a spotlight, a shank secured to said spotlight, a stud arranged to project within the socket in the end of said tubular arm, said stud having a transverse pin-receiving recess, a universal joint connecting said shank and said stud, a pin disposed within said tubular bracket member and arranged to project into the pin-receiving recess in said stud, a spring for withdrawing said pin from said recess, and a key-operated lock having a cam arranged to engage the ends of both of said pins in said tubular arm to move said pins outwardly into locking engagement with said jaw member and said stud, respectively.

5. A spotlight supporting bracket comprising a tubular bracket member, a jaw member rigidly secured to one end of said tubular bracket member, said jaw member having a slot adjacent the end of said bracket member and having an opening at a point removed from said slot and being provided with a curved jaw portion, a movable jaw member arranged to project through the opening in said fixed jaw member, said movable jaw member having a curved jaw and having its end opposite said curved jaw bent at substantially right angles and arranged to project through the slot in said fixed jaw member, said bent end having a perforation therein and being threaded for the reception of a nut, a pivot pin connecting said two jaw members, a spotlight secured upon a shank, the bottom end of said shank being arranged to project through the end of said tubular bracket member and being provided with a transverse perforation, a universal joint interposed in said spotlight shank, a pin disposed within said bracket member and arranged to project within the perforation in said spotlight shank, another pin disposed within said bracket member and arranged to project into the perforation in said movable jaw, and a lock disposed within said tubular bracket member and controlling the movement of said pins.

Seattle, Washington, September 25, 1919.

W. XAVIER NORTON.